United States Patent [19]

Sakuramoto et al.

[11] Patent Number: 5,145,726
[45] Date of Patent: Sep. 8, 1992

[54] SHEET FOR FORMATION OF BURNED PATTERN AND BURNING LABEL

[75] Inventors: Takafumi Sakuramoto; Takashi Tominaga; Itsuroh Takenoshita; Megumi Ashida, all of Osaka, Japan

[73] Assignee: Nitto Denko Corporation, Osaka, Japan

[21] Appl. No.: 679,481

[22] Filed: Apr. 2, 1991

[51] Int. Cl.⁵ .............................................. B32B 9/00
[52] U.S. Cl. ................................. 428/195; 428/204; 428/206; 428/210; 428/323; 428/913
[58] Field of Search ............... 428/195, 913, 204, 206, 428/323, 210

[56] References Cited

U.S. PATENT DOCUMENTS

| | | | |
|---|---|---|---|
| 4,971,858 | 11/1990 | Yamano et al. | 428/210 |
| 5,008,151 | 4/1991 | Tominaga et al. | 428/343 |
| 5,019,440 | 5/1991 | Ogasawara et al. | 428/195 |
| 5,049,443 | 9/1991 | Leotta et al. | 428/195 |

Primary Examiner—Patrick J. Ryan
Assistant Examiner—W. Krynski
Attorney, Agent, or Firm—Sughrue, Mion, Zinn Macpeak & Seas

[57] ABSTRACT

A sheet for formation of a burned pattern, which comprises a laminated layer structure comprising a glass powder-containing layer comprising glass powder and a resin binder, an adhesive layer and a combustible substrate layer, the combustible substrate layer being provided on the surface and/or in the interior of the glass powder-containing layer in the laminate layer structure, or the combustible substrate layer being provided on the glass powder-containing layer having a pattern when the glass powder-containing layer is provided with a pattern comprising heat-resistant ink. A burning label is also disclosed, the burning label comprising a sheet for formation of a burned pattern, the sheet being provided with a pattern comprising heat-resistant ink, or a pattern made of pores or irregularities or obtained by punching the sheet.

6 Claims, 1 Drawing Sheet

SHEET FOR FORMATION OF BURNED PATTERN AND BURNING LABEL

BACKGROUND OF THE INVENTION

1. a. FIELD OF THE INVENTION

The present invention relates to a sheet for formation of a burned pattern, which comprises a laminate structure comprising a glass powder-containing layer, an adhesive layer and a combustible substrate layer, and has excellent breakage resistance, and a burning label comprising the sheet.

2. b. BACKGROUND OF THE RELATED ART

With the change of production system to multi-kind and small-quantity production, for example, a sheet for formation of a burned pattern as obtained by forming a sheet using glass powder and a wax binder has been proposed as an identification label for use in the administration of products made of metal, glass, sintered ceramics, etc., semi-finished products or parts, because conventional substrate type identification label comprising sintered ceramics, metal or enamel have problems such as being time consuming and labor intensive to affix with a screw, etc., the problem of inability to affix on curved surface because of label stiffness, and the problem of lack of instant formation in a desired manner of the identification label due to required positioning of a pattern on a spot.

By burning the above sheets for formation of a burned pattern, a burned body is fixed to an adherend member. The sheet has a flexibility and an expedient label forming ability, and its burned body has excellent mar resistance, heat resistance and resistance to chemicals.

However, such conventional sheets for formation of a burned pattern have problems; the sheets have poor adhesion to adherends so that they must be temporarily fixed to the adherends by means of adhesives or pressure-sensitive adhesives and the sheets are poor in expedient adhesion. Furthermore, the sheets have serious problems in practical use that the sheets tend to break, cause cracking or breakage during the formation of a pattern or the temporary fixation thereof to the adherends and are poor in handling properties.

SUMMARY OF THE INVENTION

An object of the present invention is to provide a sheet for formation of a burned pattern.

Another object of the present invention is to provide a burning label comprising the above sheet for formation of a burned pattern.

The present invention provides in one embodiment a sheet for formation of a burned pattern, which comprises a laminate structure comprising a glass powder-containing layer comprising glass powder and a resin binder, an adhesive layer, and a combustible substrate layer, the combustible substrate layer being provided on the surface and/or in the interior of the glass powder-containing layer in the laminate structure.

The present invention provide in another embodiment a sheet for formation of a burned pattern, which comprises a laminate structure comprising a glass powder-containing layer comprising glass powder and a resin binder, an adhesive layer, and a combustible substrate layer, the glass powder-containing layer having a pattern comprising a heat resistant ink and the combustible substrate layer being provided on the glass powder-containing layer.

The present invention also provides a burning label comprising a sheet for formation of a burned pattern, wherein the sheet is provided with a pattern comprising a heat resistant ink, or a pattern made of pores or irregularities or obtained by punching the sheet for formation of a burned pattern.

DETAILED DESCRIPTION OF THE INVENTION

Figure 1:
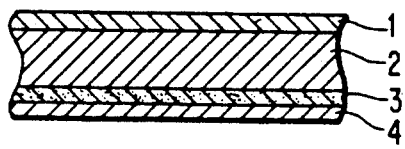
FIGS. 1, 2, 3 and 4 each shows the cross-sectional view of the structure of one embodiment of a sheet for formation of a burned pattern according to the present invention.
Figure 2:
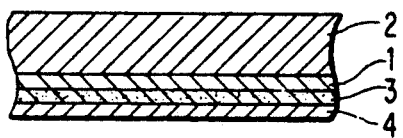
Figure 3:
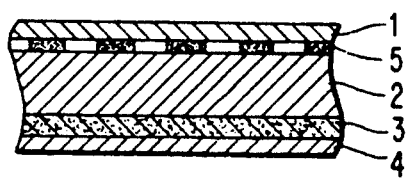

The present inventors have eagerly made studies to overcome the problems involved in conventional sheets for formation of a burned pattern and have found that the problems can be overcome by reinforcing the sheets with addition of an adhesive layer and a combustible substrate layer thereto. The present invention has been accomplished on the basis of this finding.

In conventional methods using adhesives, etc. during the course of the temporary fixation of the sheet, often the deformation of the burned sheet has been caused by the combustion of the adhesives during burning. Hence, it was quite unexpected that addition of such a combustible substrate layer did not damage the sheet during burning.

The sheet for formation of a burned pattern is converted into a burned body by burning while maintaining a pattern or form provided by heat-resistant ink, engraving pores or irregularities or punching, and at this time, a molten glass component functions as an adhesive for fixing the burned body to an adherend member. When the sheet for formation of a burned pattern contains burned residue-forming components other than the glass component, the residue-forming components are incorporated into the burned body to form a burned pattern having excellent heat resistance, mar resistance and chemical resistance. Even when a pattern comprising heat-resistant ink is formed on the outer surface of the combustible substrate layer provided on the outer surface of the glass powder-containing layer, a burned body having the pattern preserved intact can be obtained.

The sheet for formation of a burned pattern of the present invention is soft or flexible and can be readily applied to a curved surface. Since the sheet has the adhesive layer, it can be temporarily fixed to an adherend easily so that it can be simply applied. The sheet can instantly provide a pattern, an identification form or the like in a desired manner by an engraving method, a punching method or a suitable printing system such as a thermal transfer printer. Further, since the sheet is reinforced with the combustible substrate layer, the sheet has an excellent breakage resistance and scarcely causes cracking or breakage during the formation of a pattern or a shape or during temporary fixation so that it is excellent in handling properties.

The sheet for formation of a burned pattern comprises a laminate structure comprising the glass powder-containing layer, the adhesive layer and the combustible substrate layer. FIGS. 1 to 4 each shows the structure of one embodiment of the sheet wherein 1 represents the combustible substrate layer, 2 represents the glass powder-containing layer and 3 represents the adhesive layer. 4 represents a separator with which the outer surface of the adhesive layer is covered to protect it, and 5 represents a pattern layer comprising heat resistant ink. The separator 4 is peeled off when the sheet for formation of a burned pattern is temporarily fixed to an adherend.

The combustible substrate layer 1 is lost by burning at the time of burning. The layer 1 is generally formed by combustible film, woven fabric, nonwoven fabric, paper or coated layer. There is no particular limitation to the materials for forming the combustible layer. Examples of the materials include hydrocarbon resins, vinyl resins, styrene resins, acetal resins, butyral resins, acrylic resins, polyester resins, urethane resins and cellulose resins. The thickness of the combustible substrate layer is generally from 5 to 200%, preferably from 10 to 50%, of that of the glass powder-containing layer. When the thickness is too thin, a reinforcing effect tends to be poor, while when the thickness is too large, problems may cause by burning, for example, such that a burned body having a poor appearance may be obtained.

Figure 4:
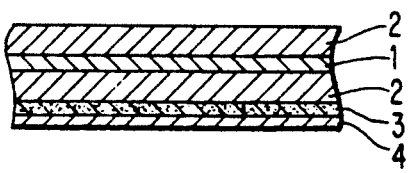

The combustible substrate layer 1 in the laminate structure is arranged on the outer surface of the glass powder-containing layer 2 with or without the pattern layer 5 comprising heat resistant ink (FIG. 1 or FIG. 3), or between the glass powder-containing layer 2 and the adhesive layer 3 (FIG. 2), or in the interior of the glass powder-containing layer 2 (FIG. 4). The combustible substrate layer 1 can be arranged in at least one position as described above. If desired, the combustible substrate layer 1 can be arranged in two or more positions. Even when a pattern layer comprising heat resistant ink is formed on the combustible substrate layer 1 provided on the outer surface of the glass powder-containing layer 2, a burned body having the pattern preserved intact can be obtained.

The glass powder-containing layer 2 is formed by containing glass powder in a binder so that a residue is fixed to an adherend by burning.

As the glass powder, any glass powder which softens or melts at a predetermined burning temperature to fix to an adherend material can be used. Therefore, any of known glass powders can be used. The glass powder generally has a particle size of from about 0.1 to 50 μm. The burning temperature can be determined according to the heat resistance, etc., of the adherend material. Examples of the glass powder include lead glass (preferred burning temperature: 400° to 600° C.) and borosilicate lead glass and soda glass (preferred burning temperature: 500° to 1,000° C.). When the burning temperature is 900° C. or higher, particularly from 1,000° to 1,200° C., silica glass or quartz glass can be preferably used.

The glass powder-containing layer is formed as an agglomeration layer composed of a burned residue-forming component (a component to be left after burning) such as glass powder, etc. and a resin binder. The burned residue-forming component may be composed of glass powder alone. Generally, other component is used together with glass powder. Examples of the other component which can be used in the present invention include inorganic powders or fibers of ceramic (represented by pigments, fillers, etc.), metals or alloys and oxides thereof. The burned residue-forming component other than glass powder is held by the softened product or molten product of the glass powder during burning and incorporated into the burned body.

The composition of the burned residue-forming component can be properly determined according to the purpose of use. When the burning temperature is low or a burned body having a smooth surface is produced, it is preferred that a large amount of glass powder having a low melting point is used. When the burning temperature is high or a burned body having a smooth surface is not required, a large amount of the burned residue-forming component other than glass powder may be used. Generally, the composition of the burned residue-forming component is composed of from 1 to 100% by weight, preferably from 1 to 97% by weight, more preferably from 10 to 95% by weight of glass powder and from 99 to 0% by weight, preferably from 99 to 3% by weight, more preferably from 99 to 5% by weight of other burned residue-forming components. The burned residue-forming components other than glass powder can be used alone or in a combination of two or more. With regard to the size of the component, powder having a particle diameter of from 0.1 to 20 μm and fiber having a diameter of from 0.1 to 20 μm and a length of 100 μm or shorter are generally used, but it is not limited thereto.

When a good contrast to the adherend material is desired as in the case of an identification label, a coloring material may be used. Examples of suitable coloring material include pigments or fillers.

Examples of the pigments or the fillers which can be used in the present invention include materials whitening after burning such as silica; white materials such as calcium carbonate, titanium oxide, zinc flower, zirconia, calcium oxide, alumina and metal compounds which are oxidized at a temperature of not higher than the burning temperature to form the above-described oxides, such as carbonates, nitrates and sulfates; red materials including a metal ion such as iron, chromium, copper, gold or selenium ions (e.g., manganese oxide, alumina, chromium oxide, tin oxide, iron oxide, cadmium oxide, selenium oxide, etc.); blue materials including a metal ion such as copper, manganese, cobalt or iron ions (e.g., cobalt oxide, zirconia, vanadium oxide, chromium oxide, divanadium pentoxide, etc.); and black materials including a metal ion such as iron, copper, manganese, chromium or cobalt ions (e.g., chromium oxide, cobalt oxide, iron oxide, manganese oxide, etc.).

Examples of the resin binder for use in agglomerating the burned residue-forming components include combustible resins such as hydrocarbon resins, vinyl resins, styrene resins, acetal resins, butyral resins, acrylic resins, polyester resins, urethane resins and cellulose resins. From the standpoint of the burning properties such as the superiority of combustibility or heat decomposability, hydrocarbon resins, acetal resins, acrylic resins and cellulose resins are preferred. Among them, acrylic resins are particularly preferred.

When there is a great difference in characteristics such as heat decomposition temperature between the resin binder and the combustible substrate layer, the resulting burned body tends to cause expansion or a failure in appearance such as deformation. For this reason, it is preferred that the resin binder and the combustible substrate layer are composed of the same material.

The amount of the resin binder used can be appropriately determined according to the specific gravity and particle size of the burned residue-forming component such as glass powder and is generally from 5 to 50 parts by weight per 100 parts by weight of the sum of the glass powder and other burned residue-forming components.

In the formation of the glass powder-containing layer, suitable additives such as plasticizer, dispersant, etc. may be optionally blended.

Conventional plasticizers can be used, and the examples thereof include phthalic acid esters, trimellitic acid esters, ester-type oligomers, acrylic oligomers, and the like. The plasticizer is generally used in an amount of 0.1 to 100 parts by weight per 100 parts by weight of the resin binder, and a desired flexibility can be obtained by the use thereof in such amount.

Examples of the dispersant include surface active agents, aliphatic acids, aliphastic acid esters, fish oils, and the like. The amount of dispersant used is generally 0.01 to 10 parts by weight per 100 parts by weight of the burned residue-forming component.

The glass powder-containing layer can be formed, for example, by mixing components in a solvent in a ball mill, spreading the resulting mixed composition over a supporting substrate such as a separator in an appropriate method, and then drying. When a combustible substrate layer-forming material such as a combustible film is used as the supporting substrate, there is an advantage that a stage for laminating the combustible substrate layer and the glass powder-containing layer in a laminating system can be omitted. However, the laminating can also be employed. As the spreading system, the doctor blade method is preferred from the standpoint of controlling the accuracy of the thickness of the layer. It is preferred that a defoaming treatment is carried out, for example, by using an anti-foaming agent so as not to allow any bubbles to be left in the spreading layer. The thickness of the glass powder-containing layer varies depending on the purpose of use, but is generally from 10 $\mu$m to 5 mm.

If desired, the combustible substrate layer is formed by coating a resin solution, etc. on the previously formed glass powder-containing layer.

The adhesive layer in the sheet for formation of a burned pattern according to the present invention is formed so as to be lost at the time of burning. Accordingly, there can be used any of adhesive layer-forming agents which have a sufficient adhesive force to temporarily fix to the adherend member and are lost, for example, by thermal decomposition at a temperature of not higher than the burning temperature. In general, rubber adhesives, acrylic adhesives, vinyl alkyl ether adhesives, etc. may be used. Preferably, rubber adhesives comprising natural rubber (including synthetic natural rubber) or a polymer such as butyl rubber, polyisoprene rubber, styrene-butadiene rubber, styrene-isoprene-styrene block copolymer rubber or styrene-butadiene-styrene block copolymer rubber; rubber adhesives obtained by adding 10 to 300 parts by weight of a tackifier such as petroleum resin, terpene resin, rosin resin, xylene resin or cumarone-indene resin and other additives such as softener, antioxidant, colorant, filler, etc. to 100 parts by weight of the above polymer; and acrylic adhesives mainly composed of a polymer of an alkyl ester of acrylic acid or methacrylic acid are used.

The adhesive layer can be provided by a suitable method such as a method wherein the adhesive layer provided on the separator is transferred or a method wherein the adhesive layer is coated on the glass powder-containing layer or the combustible substrate layer. The thickness of the adhesive layer can be properly determined according to the purpose of use, but is generally from 1 to 500 $\mu$m.

The sheet for formation of a burned pattern according to the present invention is used in a manner such that the sheet is temporarily fixed to an adherend material and then burned, so that a burned body composed of the residual component is fixed to the adherend material by burning.

In this case, there can be used a method wherein a material to be fixed is provided on the sheet for formation of a burned pattern which has been fixed on an adherend material, and then burned to thereby fix the material to the adherend material through the burned body of the sheet for formation of a burned pattern.

Burning is carried out under suitable heating conditions according to the type of the glass powder used.

In another embodiment of the present invention, the burning label is prepared by providing a pattern comprising heat resistant ink on the above-described sheet for formation of a burned pattern. In still another embodiment of the present invention, the burning label is prepared by engraving a pattern comprising holes or irregularities on the sheet for formation of a burned pattern. In still another embodiment of the present invention, the burning label is prepared by punching it from the sheet for formation of a burned pattern into a desired shape. The burning label may be in a composite form of two or more of the above embodiments.

As the heat resistant ink used to provide a pattern on the sheet for formation of a burned pattern, there can be used ink in a paste form as obtained by mixing glass powder, inorganic pigment, etc. with a binder, the ink conventionally used in a direct coating system by screen printing system or in a transfer printing system of a coated pattern on a transfer paper. Alternatively, ink formed by using the burned residue-forming component of the glass powder-containing layer forming materials such as glass powder can be used. In the latter case, the mixing composition generally comprises from 0 to 95% by weight of glass powder, and from 100 to 5% by weight of other burned residue-forming components. Optionally from 5 to 50% by weight (based on the total amount of the burned residue-forming components) of a binder may further be used.

Any of pattern-forming methods using heat resistant ink can be used and any of patterns can be used. Any of desired patterns such as a printed pattern, a transferred pattern, a picture pattern or a bar code pattern may be formed on the glass powder-containing layer 2 of the sheet for formation of a burned pattern or the combustible substrate layer 1 provided on the glass powder-containing layer by a suitable pattern-forming method such as a handwriting method, a coating method through a pattern-forming mask, a method of transferring a pattern provided on a transfer paper, a method of forming a pattern with a printer, or the like.

An ink sheet such as a printing ribbon which is used in the formation of a pattern with a printer such as an XY plotting printer, a wire dot printer, a thermal transfer printer or an impact printer can be formed by retaining heat-resistant ink on a supporting substrate such as a film or cloth by a coating method, an impregnating method or the like. The pattern-forming method using a printer has an advantage that a suitable pattern can be efficiently formed with high accuracy.

In the case of the formation of an identification label, it is preferred that heat-resistant ink prepared by using the burned residue-forming components such as pigment different from those of the sheet for formation of a burned pattern is used so that a good contrast or a difference in a color tone is formed between the background and the pattern.

Figure 5:
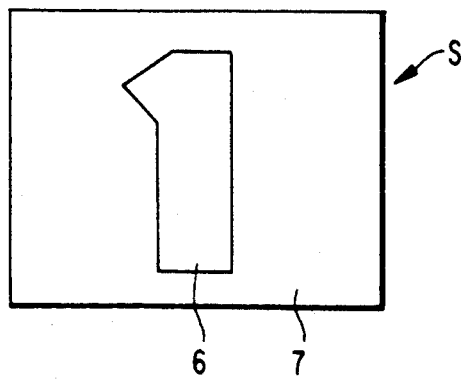
FIGS. 5, 6 and 7 each shows one embodiment of the formation of a pore-line pattern according to the present invention.
Figure 6:
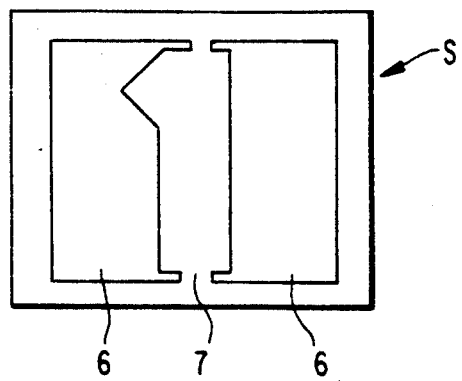

Any of methods for forming a burning label by engraving a pattern of holes or irregularities on the sheet for formation of a burned pattern can be used, and any patterns can be formed. In the pore pattern, there can be used any suitable display method such as a method wherein the pore part 6 in the sheet S for formation of a burned pattern indicates a display content as shown in FIG. 5 and a method wherein the remainder 7 of the sheet other than the pore parts 6 in the sheet S for formation of a burned pattern indicates a display content as shown in FIG. 6.

Figure 7:
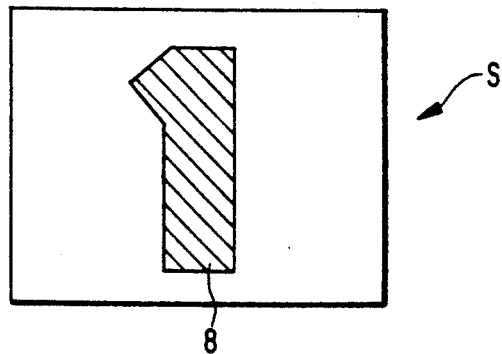

Further, there may be used a method wherein a pore-line pattern 8 in the punched form is formed on the sheet S for formation of a burned pattern and in the final stage, only the inside portion (the hatched portion) of the pore-line pattern 8 is left on the adherend material as shown in FIG. 7. This method can be preferably applied to the formation of a bar code pattern or a picture pattern, and can be advantageously used in the case where punching is undesirable, because a punched product is readily broken. This method can also be used in the formation of a pattern comprising irregularities for decorative use as well as in the formation of an identification label such as a bar code pattern applied to an identification device for detecting the amount of reflected light.

The step for forming the above burning label by providing a pattern or form on the sheet for formation of a burned pattern may be conducted before or after the temporary fixation of the sheet for formation of a burned pattern to the adherend material. In the former case, a burning label is formed in advance and hence there is an advantage that a pattern can be formed with high accuracy by using a suitable apparatus. In the latter case, a burning label is formed by treating the sheet for formation of a burned pattern which has been temporarily fixed to the adherend material, and hence there is an advantage that an irregularity pattern can be formed under temporary fixation, or the deformation of the irregularity pattern by temporary fixation can be prevented, that is, the pattern is kept with ease.

By burning the burning label temporarily fixed to the adherend material at a predetermined temperature, the label as a burned body having a pattern kept thereon is fixed to the adherend material.

Accordingly, the burning label can be preferably used for providing a picture or an identification label on porcelain, glass products or enameled products. Further, the burning label can be preferably used for providing an identification label comprising the name of company, the lot number, the name of product, the person to whom goods are delivered, the export country, other desired identification symbols, color or a color pattern, or a bar code on the products of glass, ceramics or metals, convey palettes, or particularly heat-resistant substrates of ceramics or ceramic articles made on an experimental basis.

When the adherend material is made of unsintered ceramics, the burning of the sheet for formation of a burned pattern or the burning label can be carried out simultaneously with the sintering or heat-treatment of the adherend material.

In the sheet for formation of a burned pattern, the sheet is reinforced with the combustible substrate layer so that a pattern can be provided by an ink-printing method, an engraving method or a punching method while preventing the expansion or deformation of the resulting burned body without cracking or breaking. Further, the sheet can be temporarily fixed to the adherend material and is excellent in handling properties. Furthermore, the sheet has the adhesive layer so that the sheet can be temporarily fixed to the adherend material with ease.

Moreover, the sheet can be easily applied to the materials having various surfaces such as a curved surface, and can instantly provide a pattern in a desired manner. In addition, the sheet has an excellent ability to retain a pattern during burning, and the resulting burned body has excellent mar resistance, heat resistance and resistance to chemicals as well as an excellent fixation force to the adherend material.

The present invention is illustrated in greater detail by reference to the following examples and comparative examples, but the present invention is not construed as being limited thereto. In the following examples and comparative examples, all parts are by weight.

EXAMPLE 1

80 parts of lead borosilicate glass powder, 20 parts of zirconia powder, 15 parts of polyisobutyl methacrylate, 2 parts of dibutyl phthalate and 40 parts of toluene were uniformly mixed in a ball mill to prepare a slurry. The slurry was coated on a polyester film treated with a release agent and dried to form a glass powder-containing layer of about 100 $\mu$m in thickness.

A polyisobutyl methacrylate film of 20 $\mu$m in thickness was put on the glass powder-containing layer, and they were passed between rollers heated to 80° C. to laminate them.

The polyester film bonded to the glass powder-containing layer was then peeled off. An acrylic adhesive having a thickness of about 20 $\mu$m provided on a separator was bonded to the surface of the exposed glass powder-containing layer to obtain a sheet for formation of a burned pattern.

The sheet for formation of a burned pattern was cut to obtain a sheet piece having a predetermined dimension. A predetermined bar code pattern was formed on the surface of the polyisobutyl methacrylate film of the sheet piece through an ink sheet and a thermal transfer printer to obtain a burning label. The ink sheet was prepared by coating heat-resistant ink comprising a mixed paste of 20 parts of a chromium/iron oxide/cobalt oxide based black pigment, 20 parts of paraffin wax and 60 parts of toluene on a polyester film and then drying it.

The separator was peeled off from the burning label. The burning label was temporarily fixed to an aluminum base through the exposed adhesive layer and then burned at 500° C. for 30 minutes. As a result of burning, the organic components such as polyisobutyl methacrylate and the acrylic adhesive were lost by burning.

By the above procedure, an aluminum base having a burned body with a sharp black bar code pattern firmly fixed on the white background was obtained.

COMPARATIVE EXAMPLE 1

A burning label was prepared in the same manner as in Example 1 except that a sheet for formation of a burned pattern was formed without laminating the polyisobutyl methacrylate film and the bar code pattern was formed directly on the glass powder-containing layer.

When a bar code pattern was formed on the burning label by the thermal transfer system, many cracks were formed. Further, when the separator was peeled off from the adhesive layer, more larger cracks were formed and the bar code pattern was not kept before burning.

EXAMPLE 2

An acrylic adhesive having a thickness of about 15 μm provided on a separator was bonded to the surface of the polyisobutyl methacrylate film of the laminate of the glass powder-containing layer and the polyisobutyl methacrylate film prepared in the same manner as in Example 1 to obtain a sheet for formation of a burned pattern.

The sheet for formation of a burned pattern was cut to obtain a sheet piece having a predetermined dimension. A bar code pattern comprising heat-resistant ink was printed on the surface of the glass powder containing layer of the sheet piece through a mask to obtain a burning label. The heat-resistant ink was composed of a mixed paste of 20 parts of a chromium oxide/iron oxide/cobalt oxide based black pigment, 20 parts of polyisobutyl methacrylate and 60 parts of toluene.

The separator was peeled off from the burning label. Subsequently, the burning label was temporarily fixed to a glass plate through the exposed adhesive layer and burned at 500° C. for 30 minutes. As a result of burning, the organic components were lost by burning.

By the above procedure, there was obtained a glass plate to which a burned body having a sharp black bar code pattern on the white background was firmly fixed.

COMPARATIVE EXAMPLE 2

A burning label was prepared in the same manner as in Example 2 except that a sheet for formation of a burned pattern was prepared without laminating the polyisobutyl methacrylate film and the bar code pattern was formed directly on the glass powder-containing layer.

When the separator was peeled off from the adhesive layer, many cracks were formed, and the bar code on the resulting burned body was not in order.

EXAMPLE 3

The sheet for formation of a burned pattern was prepared in the same manner as in Example 2 except that the sheet had a laminate structure such that the polyisobutyl methacrylate film was provided on the pattern-printed glass powder-containing layer in the burning label of Comparative Example 2. The sheet was cut to obtain a burning label which was then burned. The organic components were lost by burning.

By the above procedure, there was obtained a glass plate to which a burned body having a sharp black bar code pattern on the white background was firmly bonded.

EXAMPLE 4

The sheet for formation of a burned pattern obtained in Example 1 was cut to obtain a sheet piece (30 mm×50 mm). A stamp having a predetermined irregularity pattern was pressed on the sheet piece to obtain a burning label.

The separator was peeled off from the burning label. The label was temporarily fixed to a glass plate through the exposed adhesive layer and burned at 500° C. for 30 minutes.

By the above procedure, there was obtained a glass plate to which a white burned body having a pressed pattern kept thereon was firmly bonded.

COMPARATIVE EXAMPLE 3

The procedure of Example 4 was repeated except that the sheet for formation of a burned pattern obtained in Comparative Example 1 was used in place of the sheet for formation of a burned pattern obtained in Example 1 to obtain a burning label. The burning label was then burned.

When the separator was peeled off from the adhesive layer, the label was broken at the greatly depressed part of the irregularity pattern.

EXAMPLE 5

A label unit was punched from the sheet for formation of a burned pattern obtained in Example 3 to obtain a burning label. The label was burned in the same manner as in Example 2.

By the above procedure, there was obtained a glass plate to which a burned body having a sharp black bar code pattern on the white background was firmly bonded.

COMPARATIVE EXAMPLE 4

The procedure of Example 5 was repeated except that a burning label was punched from the sheet for formation of a burned pattern obtained in Comparative Example 3 in place of the sheet for formation of a burned pattern obtained in Example 3. The burning label was burned.

Several broken places were found on the periphery of the resulting burned body, because the edge of the label was broken at the time of punching.

EXAMPLE 6

A polyisobutyl methacrylate film of 20 μm in thickness was put on a glass powder-containing layer of about 50 μm in thickness prepared in the same manner as in Example 1. Further, a glass powder-containing layer of about 50 μm in thickness was placed thereon, and they were passed between rollers heated to about 100° C. to laminate them. A polyester film bonded to the glass powder-containing layer was peeled off. An acrylic adhesive of about 20 μm in thickness was bonded to the surface of the glass powder-containing layer to obtain a sheet for formation of a burned pattern.

A label unit was punched from the sheet for formation of a burned pattern into a desired shape. The separator was peeled off from the burning label composed of the punched product. The label was temporarily fixed to a glass plate through the adhesive layer. The polyester film left on the outer surface of the glass powder-containing layer was peeled off. The label was burned at 500° C. for 30 minutes.

By the above procedure, there was obtained a glass plate to which a white burned body having the well-preserved shape was firmly bonded.

EXAMPLE 7

A sheet piece (30 mm×50 mm) cut from the sheet for formation of a burned pattern obtained in Example 1 was temporarily fixed to a glass plate. A stamp having a predetermined irregularity pattern was pressed on the sheet to obtain a burning label.

The label was burned in the same manner as in Example 4 to obtain a glass plate to which a white burned body having the well-preserved pressed pattern was firmly bonded.

While the invention has been described in detail and with reference to specific embodiments thereof, it will be apparent to one skilled in the art that various changes and modifications can be made therein without departing from the spirit and scope thereof.

What is claimed is:

1. A sheet for formation of a burned pattern, which comprises a laminate structure comprising
   a glass powder-containing layer comprising glass powder and a resin binder
   an adhesive layer, and
   a combustible substrate layer, said glass powder containing layer is above the said adhesive layer,
   above the said glass powder containing layer;
   within the said glass powder containing layer;
   wherein the location of the combustible substrate layer is in a position selected from the group consisting of:
   between the said glass powder containing layer and the said adhesive layer;
   above the said glass powder containing layer and within the said glass powder containing layer;
   above the said glass powder containing layer and between the said glass powder containing layer and the said adhesive layer;
   above the said glass powder containing layer, within the said glass powder containing layer and between the said glass powder containing layer and the said adhesive layer; or
   within the said glass powder containing layer and between the said glass powder containing layer and the said adhesive layer.

2. A burning label comprising a sheet for formation of a burned pattern as claimed in claim 1, said sheet being provided with a pattern comprising heat-resistant ink.

3. A burning label comprising a sheet for formation of a burned pattern as claimed in claim 1, said sheet being provided with a patten made of either pores, irregularities, or both pores and irregularities.

4. A burning label comprising a sheet for formation of a burned pattern as claimed in claim 1, said sheet being provided with a pattern formed by punching said sheet.

5. A sheet for formation of a burned pattern, which comprises a laminate structure comprising
   a glass powder-containing layer comprising glass powder and a resin binder,
   an adhesive layer, and
   a combustible substrate layer, said glass powder-containing layer having a pattern comprising heat-resistant ink and said combustible substrate layer being provided on said glass powder-containing layer.

6. A burning label comprising a sheet for formation of a burned pattern as claimed in claim 5, said sheet being provided with a pattern formed by punching said sheet.

* * * * *